Patented May 2, 1933

1,906,937

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed July 28, 1931. Serial No. 553,641.

This invention relates to the treatment of rubber and similar materials, more particularly to a treatment of the same with the reaction products of ketones and salts of aromatic amino compounds. It also relates to the products of such treatment.

An object of this invention is to provide materials having the property of retarding the deterioration of rubber. Other objects will be apparent from the hereinset forth description.

Accordingly the invention comprises treating rubber or similar materials with the reaction product of a ketone and a salt of an aromatic amino compound.

Examples of reaction products of ketones and salts of aromatic amino compounds,— acetone-diphenyl guanidine hydrochloride, acetone-di-o-tolyl guanidine hydrochloride, acetone-o-tolyl biguanide hydrochloride, acetone-di-phenylamine hydrochloride, acetone-phenyl-beta-naphthylamine hydrochloride, acetone-o, o'-diamino-diphenyl sulfide hydrochloride.

Instead of the ketones mentioned above the following may be used: phorone, diethyl ketone, benzo phenone, acetophenone, dichloracetone, aldol acetone, allyl-acetone, benzal acetone, diacetyl, acetyl-acetone, acetonyl-acetone, salicyl aldehyde-acetone, furfural-acetone, mesityl oxide, diacetone alcohol.

Instead of the aromatic amino compounds mentioned above there may be used: dinaphthylamines, diamino diphenyl polysulphides, diamino dinaphthyl sulfides, p-amino benzylaniline, dinaphthyl diamino ethane, ditolyl diamino ethane, p-amino-p'-naphthylamino diphenyl methane, p-p' dinaphthyl amino diphenyl dimethyl methane, phenyl beta naphthyl guanidine, phenyl-o-tolyl guanidine, di-o-tolyl biguanide, monophenyl biguanide, diphenyl biguanide, diphenyl acetamidine, diphenyl-p-phenylene diamine, ditolyl-p-phenylene diamine, dinaphthyl-p-phenylene diamine, diphenyl-benzidine, dinaphthyl-benzidine. naphthyl-m-toluylene diamine, dinaphthyl-m-toluylene diamine; 2.4-diamino-diphenylamine; 4,4'-diamino diphenylamine; or mixtures of any of the foregoing aromatic amino compounds with a phenol such as phenol, alpha-naphthol, beta-naphthol.

In the reactions of ketones with salts of secondary aromatic amino compounds, such armoatic amino compounds as contain at least one ortho or para carbon atom linked to hydrogen, have been found to be most suitable.

The reaction may be carried out with or without the aid of a dehydrating agent. The following chemicals or mixtures thereof may be used as dehydrating agents: Calcium chloride, iodine, sulphanilic acid, hydrochloric acid, sulphuric acid, phosphorus pentoxide, sodium hydroxide, magnesium perchlorate, acetic acid, barium oxide, zinc chloride, etc. It is an advantage to use the amine-addition product with zinc chloride, for example ($C_6H_5NH_2$), $ZnCl_2$, as a dehydrating agent.

*Example 1.*— Diphenylguanidine-hydrochloride was found to react readily with acetone. A temperature of 120° C. and a reaction time of 20 hours are required to obtain a practically complete reaction. In this case, again, methane is produced. The acetone-diphenylguanidine-hydrochloride reaction product is prepared as follows:

211 grams diphenylguanidine (1 mole) are added to 110 grams 36% aqueous hydrochloric acid. The solution of diphenylguanidine hydrochloride is filtered through glass wool and can be used as such, without removal of water. 400 grams of acetone are added and the mixture is heated in an autoclave at 120° C. during 20 hours. After cooling, the methane formed is blown off, excess acetone is recovered and the hydrochloric acid is neutralized with 10% sodium hydroxide solution. The resulting product is an oil which floats on top of the water layer. After separation from the water it can be used without further purification.

1.5 parts of the reaction product of acetone and diphenylguanidine hydrochloride per 100 parts of rubber are incorporated in the usual manner in a tire tread compound. The resulting stocks are aged in the oxygen bomb for 168 hours. A similar stock is made from which the antioxidant is omitted. The mix is vulcanized and aged under the same conditions. The tensile strengths before and after ageing are shown below.

| Cure | Tensiles | |
|---|---|---|
| Before ageing | Blank | +reaction product |
| 50' at 45#  | 4075 | 4225 |
| 60' at 45#  | 4055 | 3985 |
| 75' at 45#  | 4020 | 3885 |
| 90' at 45#  | 4010 | 4160 |
| After ageing | | |
| 50' at 45#  | 1375 | 2685 |
| 60' at 45#  | 1285 | 2820 |
| 75' at 45#  | 1205 | 2495 |
| 90' at 45#  | 1215 | 2520 |

*Example 2.*—Reaction product of acetone and phenyl beta-naphthylamine hydrochloride.

74 grams of phenyl beta-naphthylamine are added to 40 grams of concentrated aqueous hydrochloric acid. The hydrochloride thus obtained is dried at 120° C. and yields 81.5 grams of phenyl beta-naphthylamine hydrochloride. 300 grams of acetone are added and the mixture is heated in an autoclave at 170–190° C. for 30 hrs. After cooling, the methane formed is blown off, excess acetone is recovered and the hydrochloric acid is neutralized with 10% caustic soda solution. After separation from the water and drying, the reaction product is a brown powder; yield, about 111 grams.

1.5 parts of the reaction product of acetone and phenyl beta-naphthylamine hydrochloride per 100 parts of rubber are incorporated in the usual manner in a tire tread compound. The resulting stock is aged in an oxygen bomb. A similar stock is made from which the reaction product is omitted. This mix is vulcanized and aged under the same conditions. The tensile strengths before and after ageing are shown below.

| | Tensiles | |
|---|---|---|
| Before ageing | Blank | +reaction product |
| Cure | | |
| 45' at 45#  | 3075 | 3355 |
| 60' at 45#  | 3630 | 4010 |
| 75' at 45#  | 4165 | 3845 |
| 90' at 45#  | 3725 | 3740 |
| After ageing 168 hrs. in oxygen bomb | | |
| 45' at 45#  | 1080 | 2450 |
| 60' at 45#  | 895 | 2585 |
| 75' at 45#  | 785 | 2045 |
| 90' at 45#  | 748 | 2800 |
| After ageing 3 weeks at 158° F. | | |
| 45' at 45#  | 1935 | 2953 |
| 60' at 45#  | 1753 | 3117 |
| 75' at 45#  | 1397 | 2950 |
| 90' at 45#  | 1440 | 3027 |

*Example 3.*—The reaction product of acetone and the hydrochloride of phenyl beta-naphthylamine. A mixture of 81.5 grams of the hydrochloride of phenyl of beta-naphthylamine, 300 grams of acetone, and 2 moles of iodine was heated in a chromium-plated iron autoclave during 30 hours at 170 to 190° C. After the reaction mixture was allowed to cool to room temperature it was observed to be still under a considerable pressure. This pressure is probably due to the presence of methane or of methyl chloride. The contents of the autoclave were liquid at room temperature. The aqueous layer was removed, and the excess of acetone was recovered by distillation. The remaining product was poured into water and made alkaline with sodium carbonate. No unreacted phenyl beta-naphthylamine was found to be present. The reaction product was a brown powder. When tested in a carbon black stock in which hexamethylene tetramine and diphenyl guanidine were used as accelerators, it gave the following results:

| Green tensiles | Blank | +1.5 pts. acetone-phenyl beta-naphthylamine hydrochloride reaction product |
|---|---|---|
| 60' at 45#  | 3630 | 4010 |
| 75' at 45#  | 4615 | 3845 |
| Aged tensiles, 168 hrs. in oxygen | | |
| 60' at 45#  | 895 | 2585 |
| 75' at 45#  | 785 | 2045 |
| Aged in air 3 wks. at 158° F. | | |
| 60' at 45#  | 1753 | 3117 |
| 75' at 45#  | 1397 | 2950 |

*Example 4.*—The reaction product of acetone and the hydrochloride of O-tolyl biguanide is made in a way similar to the preparation of the reaction product of acetone and diphenyl guanidine hydrochloride. The material was tested in the usual manner with the following results:

| Tensiles before ageing | Blank | +reaction product |
|---|---|---|
| 60' at 45#  | 4390 | 4325 |
| 75' at 45#  | 4275 | 4555 |
| 90' at 45#  | 4375 | 4205 |
| After ageing 168 hrs. in oxygen bomb. | | |
| 60' at 45#  | 1255 | 2585 |
| 75' at 45#  | 1170 | 2335 |
| 90' at 45#  | 1065 | 2065 |

*Example 5.*—100 parts of diphenylamine hydrochloride and 300 parts of acetone are heated in an autoclave during 30 hrs. at 170–190° C. The oil obtained is filtered and neutralized with dilute aqueous sodium carbonate solution. 150 parts of the reaction product are obtained. 1½ parts of the reaction product are incorporated in the usual manner in a standard tire tread compound containing 100 parts of rubber, 50 parts carbon black and a mixture of 1 part of hexamethylene tetramine and .25 parts of diphenyl guanidine. A similar mix was made but omitting the reaction product. The mixes are vulcanized in a mold for 60 minutes and 75 minutes at 45 pounds steam pressure. Samples of the resulting stocks are aged for 168 hours in the oxygen bomb, and for 3 weeks in air at 158° F. Values are given below:

|  | Tensiles before ageing | Tensiles after ageing | |
|---|---|---|---|
|  |  | Oxygen | Air |
| Blank |  |  |  |
| 60' | 4065 | 1095 | 1787 |
| 75' | 4070 | 985 | 1563 |
| + reaction product |  |  |  |
| 60' | 4005 | 2660 | 3350 |
| 75' | 3975 | 2790 | 3320 |

It is to be understood that a mixture of the reaction products or derivatives may be used in rubber instead of a single reaction product. Also that a mixture of ketones, or a single ketone may be reacted with a single salt of an amino compound or with a mixture of salts of amino compounds, such as described herein, to give products that may be used in rubber in the same manner.

The chemicals disclosed may be used to improve the properties as mentioned herein of inner tubes, tires, tread, hose, dipped goods, mechanical goods, latex or articles made from latex etc.

"The acid addition product" in the claims is to be understood as meaning a salt of the amines or amino compounds, such as the hydrochloride, the sulfate, the phosphate, the acetate, etc. Also the term "rubber" is to be construed as including natural rubber, gutta percha, balata, synthetic rubber, or other rubber-like materials.

This case is a continuation-in-part of application Serial No. 411,666, filed Dec. 4, 1929.

With the detailed description given above, it will be obvious that modifications will suggest themselves without departing from the principle of the invention, for example in the preparation of any of the hereinmentioned compounds, the corresponding thioketone or the corresponding ketone dihalide may be used in place of a ketone, and it is not desired to limit the invention otherwise than as set forth in the appended claims.

Having thus described my invention, what I claim and desire to protect by Letters Patent is:

1. A method of treating rubber which comprises treating rubber with the reaction product of a ketone and the acid addition product of a secondary aromatic amine.

2. A method of treating rubber which comprises treating rubber with the reaction product of a ketone and the acid addition product of an aryl-substituted guanidine.

3. A method of treating rubber which comprises treating rubber with the reaction product of a ketone and the acid addition product of a diaryl-substituted guanidine.

4. A method of treating rubber which comprises treating rubber with the reaction product of acetone and diphenyl guanidine hydrochloride.

5. A method of treating rubber which comprises treating rubber with the reaction product of acetone and diphenylamine hydrochloride.

6. A method of treating rubber which comprises treating rubber with the reaction product of acetone and phenyl beta-naphthylamine hydrochloride.

7. A method of improving the properties of rubber which comprises vulcanizing rubber in the presence of the reaction product of a ketone and the acid addition product of a secondary aromatic amine.

8. A method of improving the properties of rubber which comprises vulcanizing rubber in the presence of the reaction product of a ketone and the acid addition product of an aryl-substituted guanidine.

9. A method of improving the properties of rubber which comprises vulcanizing rubber in the presence of the reaction product of a ketone and the acid addition product of a diaryl-substituted guanidine.

10. A method of improving the properties of rubber which comprises vulcanizing rubber in the presence of the reaction product of acetone and diphenyl guanidine hydrochloride.

11. A method of improving the properties of rubber which comprises vulcanizing rubber in the presence of the reaction product of acetone and diphenylamine hydrochloride.

12. A method of improving the properties of rubber which comprises vulcanizing rubber in the presence of the reaction product of acetone and phenyl beta-naphthylamine hydrochloride.

13. A rubber product which has been treated with the reaction product of a ketone and the acid addition product of a secondary aromatic amine.

14. A rubber product which has been treated with the reaction product of a ketone and the acid addition product of an aryl-substituted guanidine.

15. A rubber product which has been treated with the reaction product of a ketone and the acid addition product of a diaryl-substituted guanidine.

16. A rubber product which has been treated with the reaction product of acetone and diphenyl guanidine hydrochloride.

17. A rubber product which has been treated with the reaction product of acetone and diphenylamine hydrochloride.

18. A rubber product which has been treated with the reaction product of acetone and phenyl beta-naphthylamine hydrochloride.

19. A vulcanized rubber product resulting from a process set forth in claim 7.

20. A vulcanized rubber product resulting from a process set forth in claim 8.

21. A vulcanized rubber product resulting from a process set forth in claim 9.

22. A vulcanized rubber product resulting from a process set forth in claim 10.

23. A vulcanized rubber product resulting from a process set forth in claim 11.

24. A vulcanized rubber product resulting from a process set forth in claim 12.

25. A method of treating rubber which comprises incorporating therewith prior to vulcanization the product obtained by reacting a ketone and the acid addition product of a secondary aromatic amine and treating with alkali whereby to neutralize acidity.

26. A method of treating rubber which comprises incorporating therewith prior to vulcanization the product obtained by reacting a ketone and the acid addition product of a diarylamine and treating with alkali whereby to neutralize acidity.

27. A method of treating rubber which comprises incorporating therewith prior to vulcanization the product obtained by reacting an aliphatic keytone and the acid addition product of a secondary aromatic amine and treating with alkali whereby to neutralize acidity.

28. A method of treating rubber which comprises incorporating therewith prior to vulcanization the product obtained by reacting an aliphatic ketone and the acid addition product of a diarylamine and treating with alkali whereby to neutralize acidity.

29. A method of treating rubber which comprises incorporating therewith prior to vulcanization the product obtained by reacting acetone and diphenylguanidine hydrochloride and treating with alkali whereby to neutrilize acidity.

30. A method of treating rubber which comprises incorporating therewith prior to vulcanization the product obtained by reacting acetone and diphenylamine hydrochloride and treating with alkali whereby to neutralize acidity.

31. A method of treating rubber which comprises incorporating therewith prior to vulcanization the product obtained by reacting acetone and phenyl beta naphthylamine hydrochloride and treating with alkali whereby to neutralize acidity.

Signed at Montclair, county of Essex, State of New Jersey, this 24th day of July, 1931.

WILLIAM P. ter HORST.